United States Patent
Proctor et al.

(10) Patent No.: US 10,715,315 B1
(45) Date of Patent: Jul. 14, 2020

(54) SECURE MANAGEMENT OF CONTENT USING A MIDDLEWARE LAYER BETWEEN A CLIENT AND A SERVER

(71) Applicant: BIGFORK TECHNOLOGIES, LLC, Scottsdale, AZ (US)

(72) Inventors: Neil Proctor, Scottsdale, AZ (US); Merielle Impreso, Western Visayas (PH)

(73) Assignee: BigFork Technologies, LLC, Scottsdale, AZ (US)

( * ) Notice: Subject to any disclaimer, the term of this patent is extended or adjusted under 35 U.S.C. 154(b) by 0 days.

(21) Appl. No.: 16/824,263

(22) Filed: Mar. 19, 2020

(51) Int. Cl.
*H04L 29/06* (2006.01)
*H04L 9/08* (2006.01)
*H04L 9/14* (2006.01)

(52) U.S. Cl.
CPC .............. *H04L 9/0819* (2013.01); *H04L 9/14* (2013.01); *H04L 63/061* (2013.01)

(58) Field of Classification Search
None
See application file for complete search history.

(56) References Cited

U.S. PATENT DOCUMENTS

| | | | | |
|---|---|---|---|---|
| 9,009,480 B1* | 4/2015 | Wu | .............. | H04L 9/0819 713/171 |
| 2015/0229471 A1* | 8/2015 | Nair | .............. | H04L 9/0822 713/171 |
| 2016/0134642 A1* | 5/2016 | Hamid | .............. | H04L 63/145 713/160 |
| 2017/0201378 A1* | 7/2017 | Kim | .............. | H04L 63/0876 |
| 2018/0025332 A1* | 1/2018 | Huang | .............. | G06Q 20/3674 705/71 |

(Continued)

OTHER PUBLICATIONS

Kao, Yung-Wei et al. uCloud: a user-centric key management scheme for cloud data protection. IET Information Security vol. 7, Issue: 2. https://ieeexplore.ieee.org/stamp/stamp.jsp?tp=&arnumber=6543345 (Year: 2013).*

(Continued)

*Primary Examiner* — Jeremiah L Avery
(74) *Attorney, Agent, or Firm* — Dickinson Wright, PLLC; Stephen A. Mason; Jonathan H. Harder

(57) ABSTRACT

A method performed by a client application executing on a client computing device is disclosed. The method includes generating a private key and a public key corresponding to the client application. The method also includes transmitting the public key to a middleware application executing on a middleware computing device, a server application executing on a server computing device, or both. The client application and the server application are engaged in a trusted relationship. The method also includes receiving, at the client application, a request to perform an operation on an encrypted content that is stored at the middleware computing device and that is encrypted with the public key by the middleware application or the server application, decrypting the encrypted content using the private key to generate a decrypted content, and presenting the decrypted content on a display screen of the client computing device.

20 Claims, 11 Drawing Sheets

(56) References Cited

U.S. PATENT DOCUMENTS

2019/0213587 A1* 7/2019 Chen .................... H04L 9/14
2019/0327216 A1* 10/2019 Walters ............. H04L 63/0442

OTHER PUBLICATIONS

Guo-song, Jiang; Zhi-chao, Yu. Research about Authentication and Data Security Based on Media System. 2010 International Conference on Multimedia Communications. https://ieeexplore.ieee.org/stamp/stamp.jsp?tp=&arnumber=5694188 (Year: 2010).*

Le, Tuan et al. Secure Point-of-Care Medical Diagnostics via Trusted Sensing and Cyto-Coded Passwords. 2016 46th Annual IEEE/IFIP International Conference on Dependable Systems and Networks (DSN). https://ieeexplore.ieee.org/stamp/stamp.jsp?tp=&arnumber=7579774 (Year: 2016).*

\* cited by examiner

SECURE MANAGEMENT OF CONTENT USING A MIDDLEWARE LAYER BETWEEN A CLIENT AND A SERVER

TECHNICAL FIELD

This disclosure relates to content management. More specifically, this disclosure relates to secure management of content using a middleware layer between a client and a server.

BACKGROUND

Content, such as documents, videos, images, and the like are often shared between users over a communication network, such as the internet. In some instances, the users are friends and they share content that they like with each other. In other instances, the users may be employees at an entity. One of the employees may have approval power of certain content and another user may generate the content and share the content to be approved by the employee having the approval power. In certain scenarios, it is preferable to maintain security of the content that is shared between users. Maintaining security of the content may be somewhat easy in a typical client-server architecture where a same entity operates both the client and the server. Maintaining security of the content may be more difficult when a middleware layer is used between the client and the server.

SUMMARY

Representative embodiments set forth herein disclose various techniques for enabling a system and method for electronic assignment of issues based on measured and/or forecasted capacity of human resources.

In one embodiment, a method performed by a client application executing on a client computing device is disclosed. The method includes generating a private key and a public key corresponding to the client application. The method also includes transmitting the public key to a middleware application executing on a middleware computing device, a server application executing on a server computing device, or both. The client application and the server application are engaged in a trusted relationship. The method also includes receiving, at the client application, a request to perform an operation on an encrypted content that is stored at the middleware computing device and that is encrypted with the public key by the middleware application or the server application, decrypting the encrypted content using the private key to generate a decrypted content, and presenting the decrypted content on a display screen of the client computing device.

In one embodiment, a method performed by a server application executing on a server computing device is disclosed. The method includes receiving a first request for an approver to approve content, transmitting a message to a middleware application executing on a middleware computing device, wherein the message comprises an identification of an issue pertaining to the content, an identification of the approver associated with the content, and a one-time token, and the message causes the middleware application to transmit another message to a client application executing on a client computing device associated with the identification of the approver, and the another message comprises the identification of the approver of the client application and the one-time token, receiving, from the middleware application, a second request to provide details of the content, and transmitting the details of the content to the middleware application to cause the middleware application to deliver the content in an encrypted state based on a public key shared by the client application, and the client application decrypts the content in the encrypted state to generate decrypted content based on a private key generated by the client application and stored at the client computing device.

In one embodiment, a method performed by a middleware application executing on a middleware computing device is disclosed. The method includes receiving a first request for an approver to approve content from a server application executing on a server computing device, wherein the first request comprises an identification of an issue including the content, an identification of the approver, and a one-time token, transmitting a message to a client application executing on a client computing device to notify the approver that there is a request to approve the content, wherein the message includes the one-time token that is encrypted by the middleware application or the server application using a public key distributed by the client application, receiving a second request to provide the content to the client application, retrieving the content that is stored in an encrypted state after being encrypted by the middleware application or the server application using the public key, transmitting the content in the encrypted state to the client application, which causes the client application to decrypt the content using a private key associated with the client application and present the content in a decrypted state on a display screen of the client computing device, and receiving an approval response from the client application, wherein the approval response comprises the identification of the issue, the identification of the approver, and the one-time token that is decrypted by the client application using the private key associated with the client application.

In some embodiments, a tangible, non-transitory computer-readable medium storing instructions that, when executed, cause a processing device to perform one or more of the operations described above. In some embodiments, a system may include a memory storing instructions and a processor communicatively coupled to the memory. The processor may execute the instructions to perform one or more of the operations described above.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which.

NOTATION AND NOMENCLATURE

Figure 1:
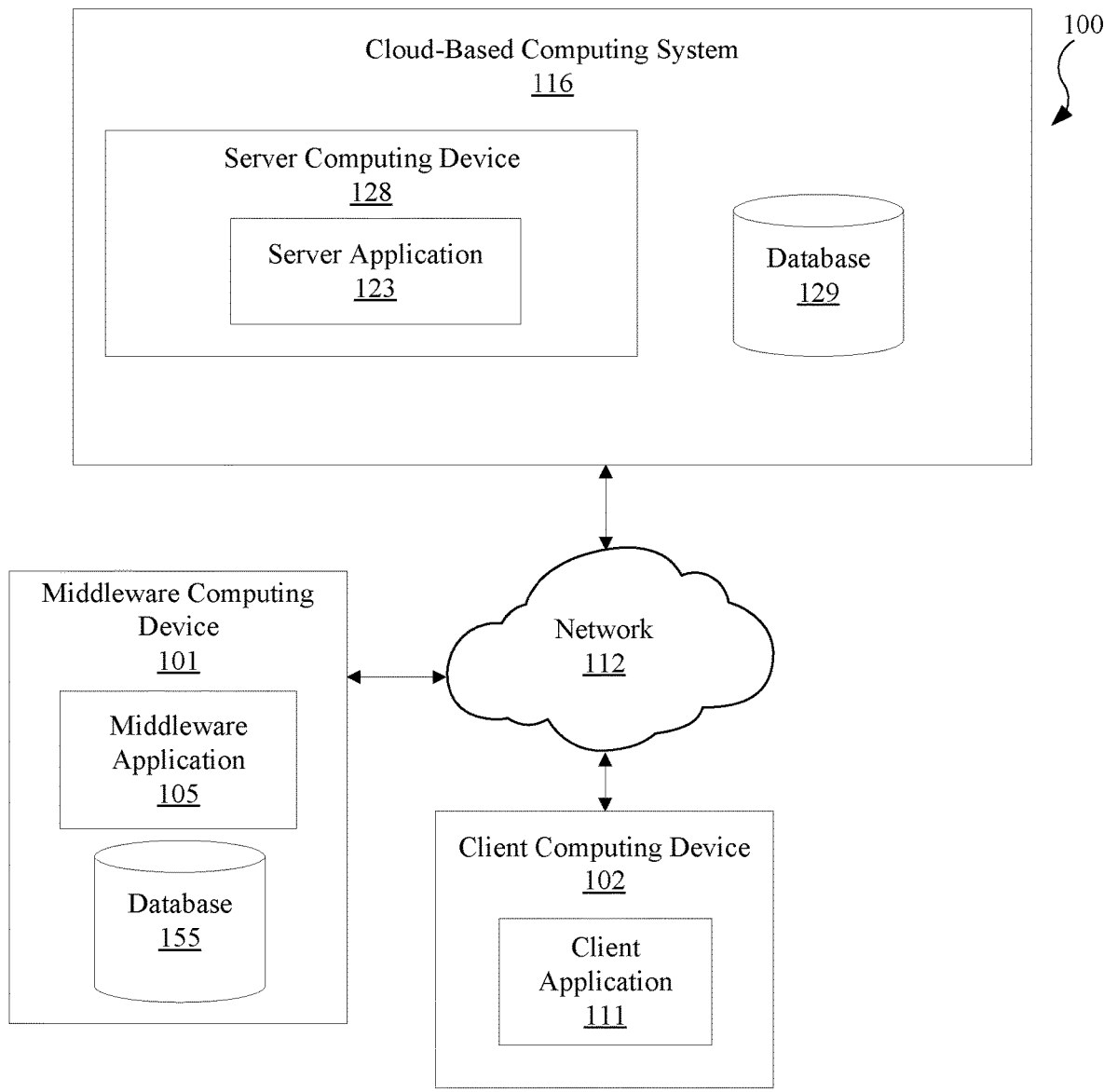
FIG. 1 illustrates a high-level component diagram of an illustrative system architecture according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

An entity may operate a secure server application on a secure backend server computing device and may develop a secure client application that is to be installed on a client computing device. The client application and the server application may be securely operated by the entity using any suitable security mechanism, such as firewalls, encryption, secure communications, and so forth. The client application may perform content management operations, such as presenting content assigned to a user of the client application, enabling the user to perform an operation on the content (e.g., approve, reject, edit, delete, etc.), and so forth. In some instances, the content may be a document, such as a legal document (e.g., contract, patent application, etc.), a financial document, a story, or any suitable document.

A middleware application executing on a middleware layer may be used to enhance scalability. For example, certain entities operate data warehouses including numerous servers that provide cloud-based services. These cloud-based services may be utilized by other entities that subscribe and/or license the cloud-based services for a fee and under certain terms of use. A platform including the client application and the server application may use the cloud-based services to transmit data back and forth and/or store data on the middleware computing device performing the cloud-based services.

The cloud-based services provided by the middleware layer has numerous benefits. For example, the cloud-based services enable scalability. As more users use the platform (e.g., client application and server application) deployed by the entity, the cloud-based services may scale by employing additional middleware computing devices such that quality of service to the users is not hindered. Further, the cloud-based services may perform caching of data, authentication of data, and/or memory management of data associated with the platform that uses the cloud-based services.

Accordingly, in some embodiments, the client application and the server application may be lightweight and consume fewer resources on the client computing device and the server computing device, respectively, because the middleware computing device(s) may perform the heavy lifting (e.g., operations that are computationally and/or memory intensive). Although there are numerous benefits to using a middleware layer that provides cloud-based services, there are also potential issues. For example, an issue may arise when the middleware layer is not operated by the same entity that developed the client application and the server application. Thus, security may be a concern when using a middleware layer.

Accordingly, aspects of the present disclosure generally relate to secure management of content using a middleware layer between a client computing device and a server computing device. The disclosed techniques may use security mechanisms to enable secure communication of content. For example, a system of private and public keys may be used by the various computing devices to enable secure transmission through and/or storage at the middleware computing device. In some embodiments, the client application may be installed on a client computing device (e.g., smartphone) and the client application may be registered to a particular user at the server computing device. The server computing device may enable acknowledging and/or accepting the user of the client application based on a particular identity (e.g., email address, name, etc.) of the user. For example, the server application may have access to a list of approved users (e.g., client entities) that are using the platform and may electronically and/or manually accept the user when the user installs the client application on their client computing device.

Upon installation of the client application, the client application may generate a private key and/or a public key. The client application may store the private key on the client computing device and may transmit the public key to the middleware application and/or the server application. The public key may be used by the middleware application and/or the server application to encrypt any content that is generated by the server computing device and that is stored at the middleware computing device. For example, a contract may be generated by the server application and may be assigned to a user of the client application. The contract may be transmitted to the middleware application and the middleware application may store the contract in an encrypted state based on the public key (e.g., the server application or the middleware application may use the public key to encrypt the contract). The middleware application may correlate the encrypted contract with an identification of the user of the client application and store the correlated encrypted contract on the middleware computing device.

Another user may request the user approve the contract, which causes the middleware application to transmit a message to the client application notifying the user to approve the contract. The client application may request the contract from the middleware application and the middleware application may deliver the contract in the encrypted state to the client application. The client application may decrypt the contract using the private key stored at the client computing device and may present the contract on a display screen of the client computing device. The user may input a selection, such as approving the contract, after reviewing the contract. The approval may be transmitted from the client computing device through the middleware computing device to the server computing device. The server application may perform a status change based on the approval and may instruct the middleware application of the approval. Upon receiving a confirmation that the contract is approve, the middleware application may perform garbage management and may delete the encrypted contract from its memory.

The disclosed techniques provide numerous benefits over conventional systems. The techniques enable untrusted intermediaries (e.g., middleware layer) to interact automatically with data flowing between a trusted server computing device and a trusted client device. The techniques may improve security of managing content using a middleware layer between a client computing device and a server computing device. For example, the content may be stored in an encrypted state on the middleware computing device such that, even if the middleware computing device is hacked, the encrypted content is safe. At the same time, the middleware layer enables a plethora of benefits such as scalability, authentication, memory management (e.g., caching), and the like. Since the middleware layer performs memory and/or processor intensive functions, the client application and the server application may be lightweight and consume fewer resources on the client computing device and the server computing device, respectively.

FIG. 1 illustrates a high-level component diagram of an illustrative system architecture 100 according to certain embodiments of this disclosure. In some embodiments, the system architecture 100 may include a middleware computing device 101, a client computing device 102, and/or a cloud-based computing system 116 that are communicatively coupled via a network 112. As used herein, a cloud-based computing system refers, without limitation, to any remote or distal computing system accessed over a network link. Each of the middleware computing device 101 and client computing device 102 may include one or more processing devices, memory devices, and network interface devices.

The network interface devices may enable communication via a wireless protocol for transmitting data over short distances, such as Bluetooth, ZigBee, near field communication (NFC), etc. Additionally, the network interface devices may enable communicating data over long distances, and in one example, the middleware computing device 101 and/or client computing device 102 may communicate with the network 112. Network 112 may be a public network (e.g., connected to the Internet via wired (Ethernet) or wireless (WiFi)), a private network (e.g., a local area network (LAN), wide area network (WAN), virtual private network (VPN)), or a combination thereof.

The middleware computing device 101 and/or the client computing device 102 may be any suitable computing device, such as a laptop, tablet, smartphone, or computer. The middleware computing device 101 and/or the client computing device 102 may include a display that is capable of presenting a user interface of a middleware application 105 and/or a client application 111, respectively. The middleware application 105 and/or the client application 111 may be implemented in computer instructions stored on a memory of the middleware computing device 101 and/or client computing device 102 and executed by a processing device of the middleware computing device 101 and/or client computing device 102.

The client application 111 may be a stand-alone application that is installed on the client computing device 102 or may be an application (e.g., website) that executes via a web browser. The client application 111 may present various user interface screens to a user that enable the user to login; receive messages (e.g., push notifications); present list of issues associated with content; present details of selected content; perform operations on the content (e.g., approve, reject, edit, return, etc.); create content; transmit messages; etc. The client application 111 may generate a public key and a private key when the client application 111 is installed on the client computing device 102. The client application 111 may transmit the public key to the middleware computing device 101 and/or the cloud-based computing system 116.

The middleware application 105 may be implemented in computer instructions stored on the one or more memory devices of the middleware computing device 101 and executable by the one or more processing devices of the middleware computing device 101. The middleware application 105 may perform various operations pertaining to managing content. For example, the middleware application 105 may create an account for a user of the client application 111; receive content from the cloud-based computing system 116; encrypt the content; store the content; create entries pertaining to operations requested to be performed on the stored content; retrieve details of the stored content; transmit the stored content in an encrypted state to the client application 111; transmit responses received from the client application 111 to the cloud-based computing system 116; perform garbage management of the stored content; etc.

In some embodiments, the cloud-based computing system 116 may include one or more server computing devices 128 that form a distributed, grid, and/or peer-to-peer (P2P) computing architecture. Each of the server computing devices 128 may include one or more processing devices, memory devices, data storage, and/or network interface devices. The server computing devices 128 may be in communication with one another via any suitable communication protocol. The servers 128 may each execute a server application 123. The server application 123 may be implemented in instructions stored on a memory of the server computing device 128. The processing devices of the server computing devices 128 may execute the instructions to perform any of the methodologies, functions, or operations described herein.

The middleware computing device 101 may include a database 155. The database 155 may store content (e.g., documents, videos, images, etc.) in an encrypted state based on the public key provided by the client application 111. When the encrypted content is stored, it may be correlated with an identification of the user associated with the encrypted content. Thus, when the user requests the content with the identification, the encrypted content may be provided to the appropriate user.

The server application 123 may register a user with the client application 111 when the client application 111 is installed on the client computing device 102. The server application 123 may generate content and may assign the content to certain users (e.g., approvers). The server application 123 may track issues pertaining to the content. For example, the server application 123 may track an issue or a ticket that indicates there are a certain number of documents that are pending approval from a certain user. The server application 123 may receive requests for a certain user to perform an operation. For example, a first user may request a second user approve a particular document. The server application 123 may transmit the approval request to the middleware application 105, which transmits a message to the client application 111 executing on the client computing device 102. The server application 123 may also provide information about content to the middleware application 105. The server application 123 may store the information in a database 129. The information may include details, metadata, or the like pertaining to the content. The database 129 may also store information pertaining to the user, the client application 111, and the like. The server application 123 may generate various user interfaces, such as an administrator user interface that presents a request to register a user with the client application 111 when the client application 111 is installed on the computing device 102. The user interface may enable an administrator to accept or reject the user during registration. The server application 123 may also perform status changes on content when an operation is performed on the content. For example, when the content is approved, the server application 123 may set a status of the content to approved in the database 129 and may transmit a message to the middleware application 105 that indicates the status change.

Figure 2:
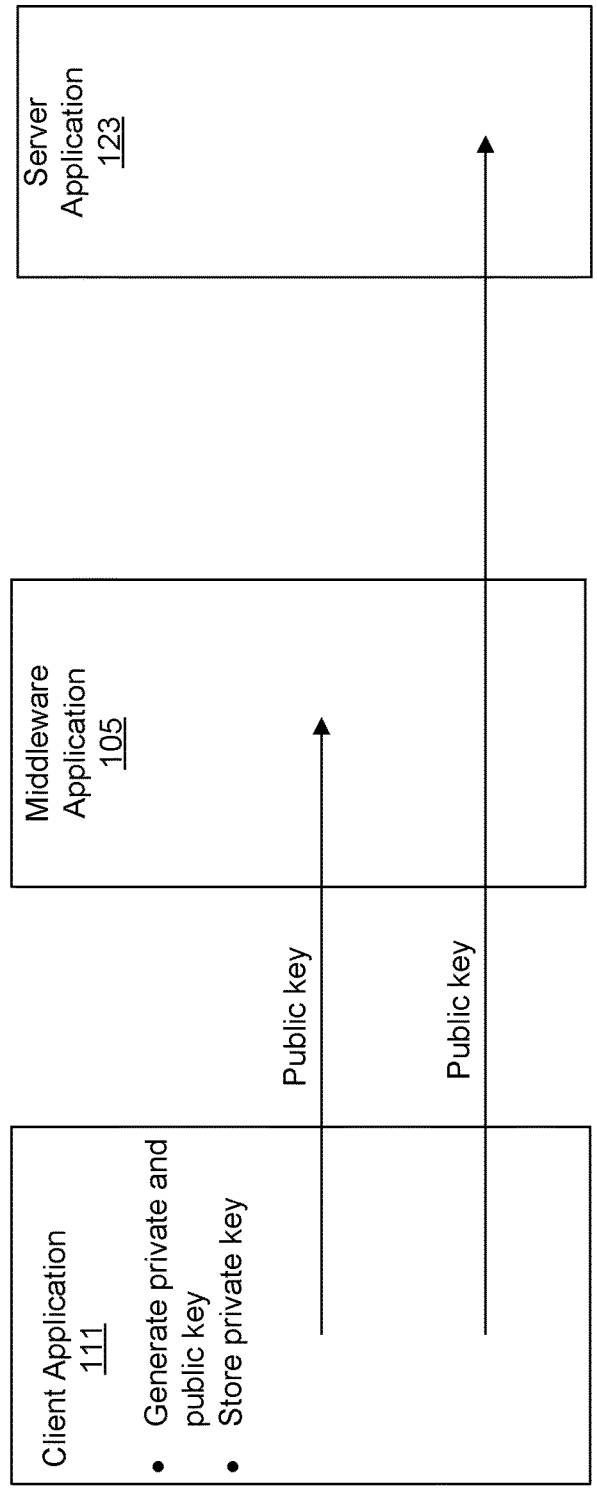
FIG. 2 illustrates an example workflow for installing a client application and generating encryption keys according to certain embodiments of this disclosure.

FIG. 2 illustrates an example workflow for installing a client application 111 and generating encryption keys according to certain embodiments of this disclosure. The client application 111 may be installed on the client computing device 102. The client application 111 may be a mobile application running on a smartphone. In some embodiments, the client application 111 may be a website running in a browser on a smartphone. Upon installation, the client application may generate a private key and a public key. The client application 111 may use any suitable cryptographic algorithm to generate the private key and the public key. As depicted, the client application 111 may store the private key in memory of the client computing device 102 and may transmit the public key to the middleware application 105 and/or the server application 123.

Figure 3:
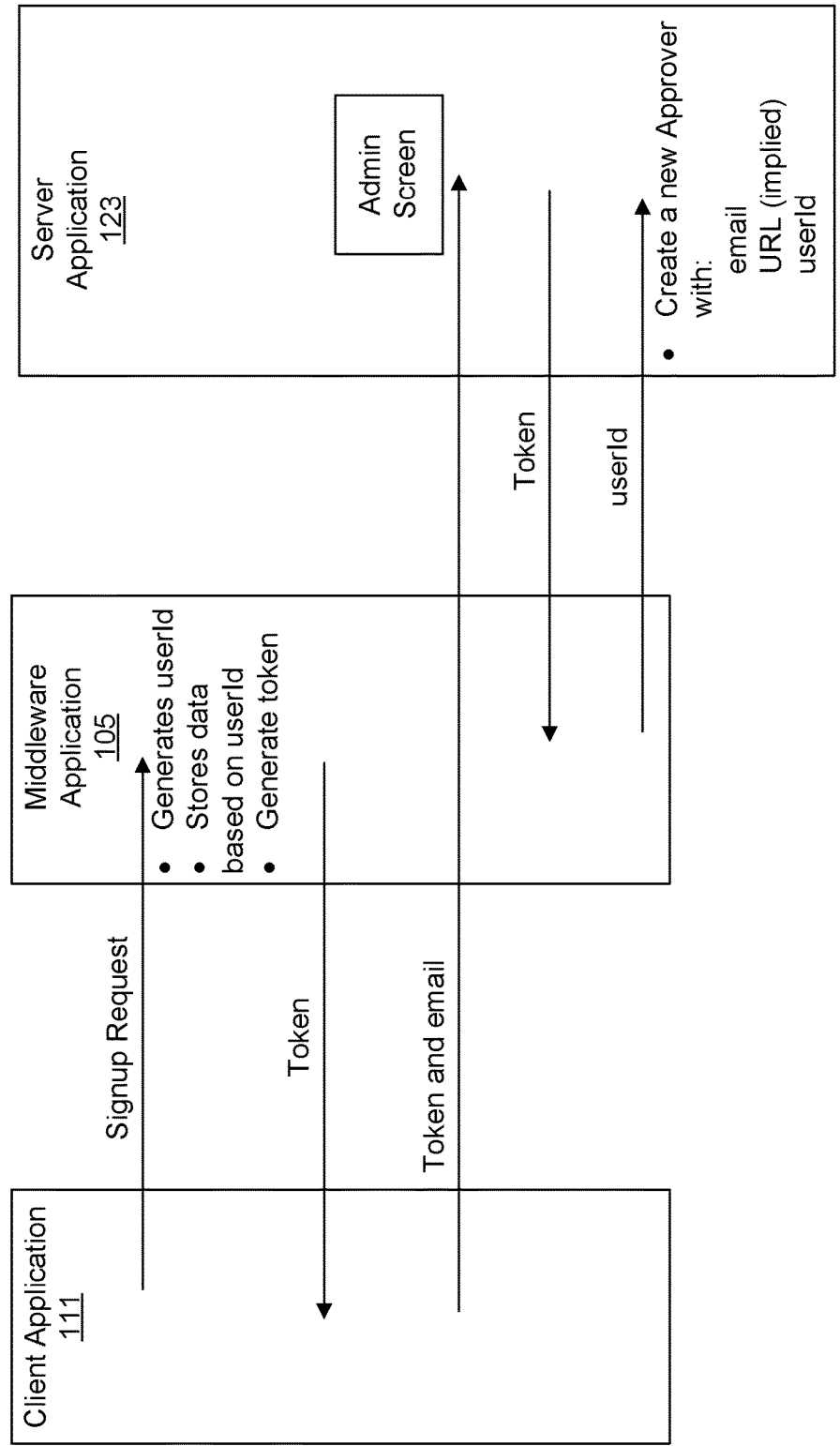
FIG. 3 illustrates an example workflow for creating a user and assigning the user an approver role according to certain embodiments of this disclosure.

FIG. 3 illustrates an example workflow for creating a user (e.g. approver) and assigning the user an approver role according to certain embodiments of this disclosure. The client application 111 may transmit a signup request to the middleware application 105. The middleware application 105 may receive the signup request and generate an identification for the user of the client application 111. The middleware application 105 may store the identification of the user in the database 155. The middleware application 105 may store content (e.g., details, metadata, etc.) in an encrypted state in the database 155 based on the identification of the user. In some embodiments, content is not stored on the middleware application 105 unless it is first encrypted. The middleware application 105 may also generate a token (e.g., unique alphanumeric string of characters) based on the signup request. The middleware application 105 may transmit the token to the client application 111.

The client application 111 may receive the token and transmit the token to the server application 123 in a message. The message may be an email to an address associated with the entity that operates and/or developed the client application 111 and the server application 123. The email may include the user's email address. The server application 123 may receive the email and present a user interface on a display screen of the server computing device 128 operated by an administrator. The user interface may present the email address of the user or any suitable indicator of the user and the administrator may determine whether to accept the user into the platform. In some embodiments, the server application 123 may electronically accept the user based on a list of accepted users. The server application 123 may transmit the token to the middleware application 105. The middleware application 105 may verify the token received from the server application 105 is the same token that was sent to the client application 111. If the token is verified, the middleware application 105 may transmit the identification of the user associated with the token and the client application 111 to the server application 123.

The server application 123 may create a new user profile having an approver role. There may be any suitable type of roles (e.g., reviewer, creator, administrator, etc.). The new user profile may include the email address of the user, the identification of the user, a universal resource locator of the client application 111 and/or website of the user, and the like. The universal resource locator may be implied.

Figure 4:
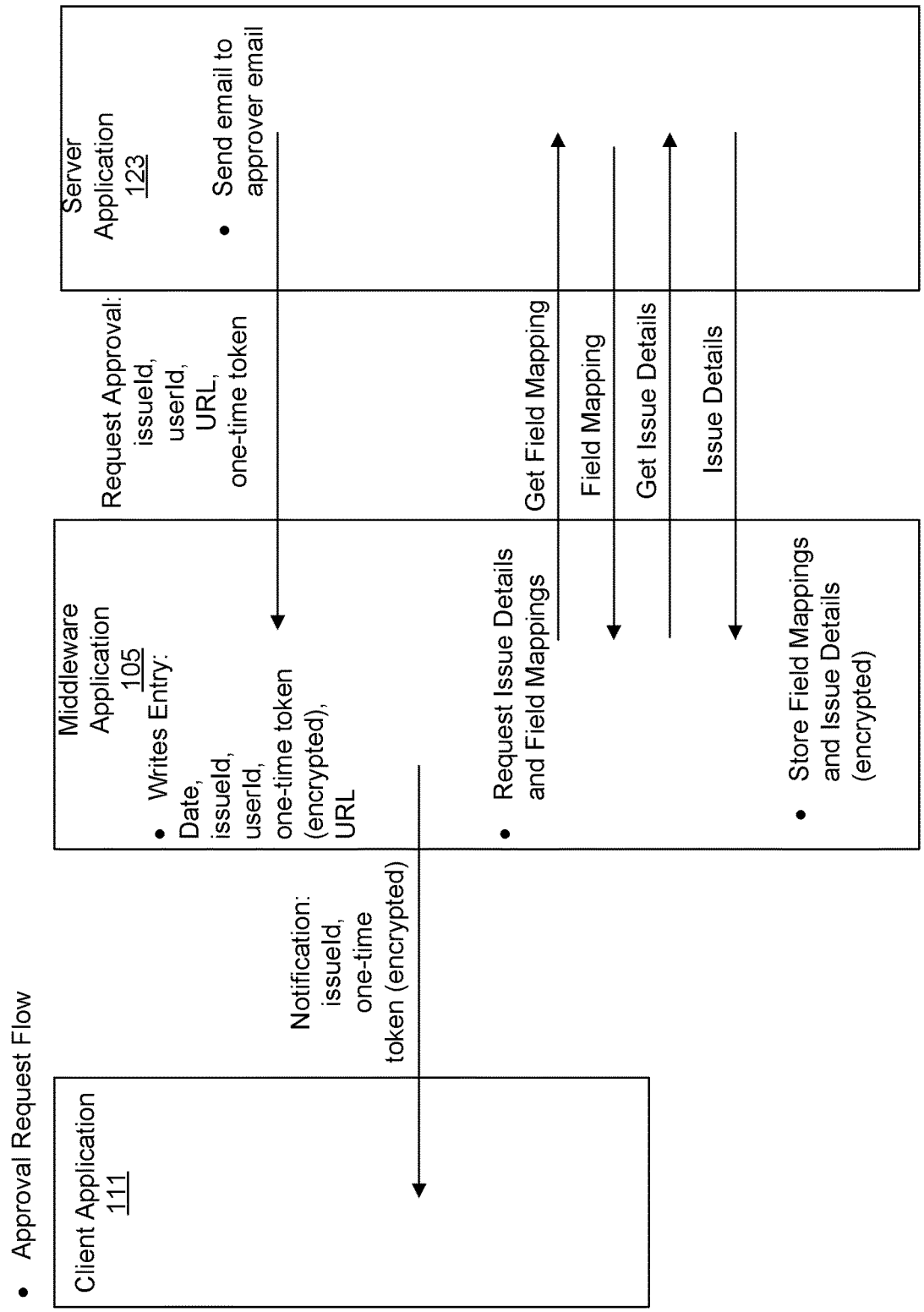
FIG. 4 illustrates an example workflow for a request for a user to approve content according to certain embodiments of this disclosure.

FIG. 4 illustrates an example workflow for a request for a user to approve content according to certain embodiments of this disclosure. The server application 123 may receive a request from a user using a separate instance of the client application on their personal client computing device. The request may include a request for the approver using the depicted client computing device 111 to approve a piece of content (e.g., document). Upon receiving the request, the server application 123 may generate a one-time token. The one-time token may be a unique alphanumeric string of characters. In some embodiments, the server application 123 may set a timer that, once expired, rejects the one-time token if received after expiration. The server application 123 may transmit an email to the email address of the approver to notify them of the request. Further, the server application 123 may transmit an approval request to the middleware application 105. The approval request may include an identification of an issue associated with the content, an identification of the approver (e.g., user), the universal resource locator, and a one-time token. In some embodiments, the server application 123 may encrypt the one-time token using the public key provided by the client application.

The middleware application 105 may receive the approval request and record an entry in the database 155. The entry may include a timestamp of when the request is received, the identification of the issue, the identification of the user, the one-time token in an encrypted state, and the universal resource locator. In some embodiments, the middleware application 105 may encrypt the one-time token if not already performed by the server application 123. The middleware application 105 may transmit a message to the client application 111. The message may be a push notification and may include the identification of the issue, and the one-time token in the encrypted state.

Further, the middleware application 105 may request issue details and field mappings pertaining to the content that is requested to be approved. The field mappings may include metadata such as who created the content, a timestamp of the content, a type of content, identities of people working on the content, etc. The server application 123 may return the field mapping. The middleware application 105 may also request the issue details pertaining to the content. The details may include the actual substance of the content (e.g., if the content is a document, the details may include the text in the document). The field mappings and the issue details may be encrypted by the server application 123 or the middleware application 105 using the public key distributed by the client application 111. The middleware application 105 may store the encrypted field mappings and issue details in the database 155.

Figure 5:
FIG. 5 illustrates an example workflow for presenting an approval list of content and details of a selected content according to certain embodiments of this disclosure.
Figure 5:
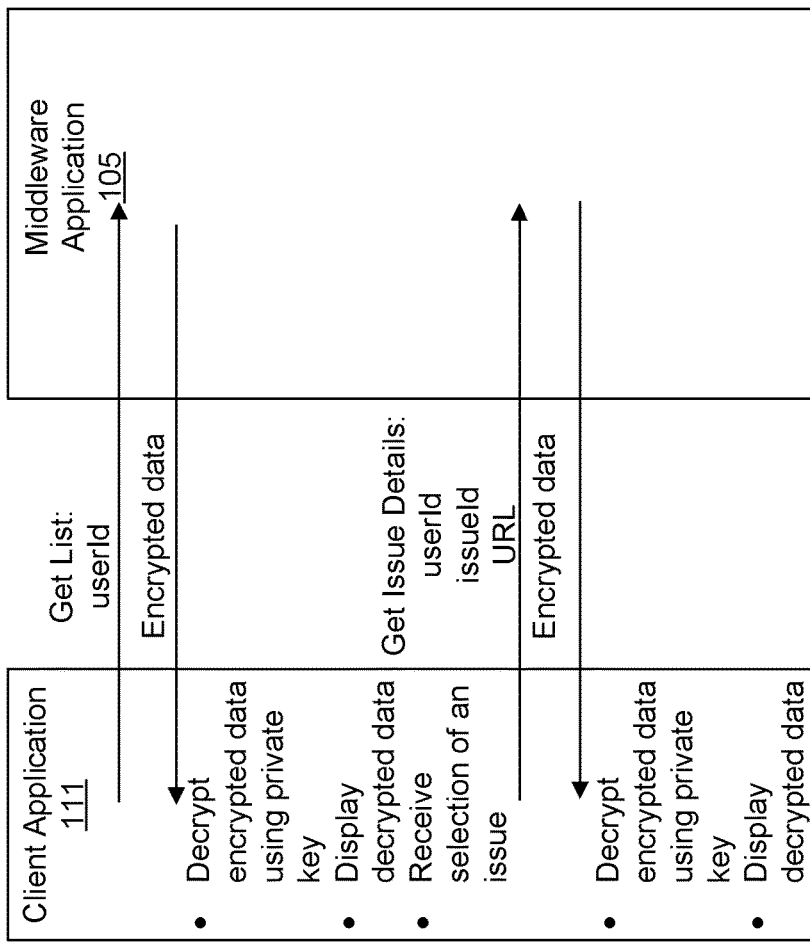

FIG. 5 illustrates an example workflow for presenting an approval list of content and details of a selected content according to certain embodiments of this disclosure. In the depicted workflow, the server application 123 is not involved as performing any operations. As depicted, a user may desire to see a list of pending issues with which they are associated. The client application 111 may transmit a request for a list of issues and the request may include the identification of the user. The middleware application 105 may return encrypted data including the list of issues and identifications of content associated with the issues. The client application 111 may decrypt the encrypted data using the private key. The client application 111 may present the decrypted data on a display screen of the client computing device 102. The user may input a selection of a piece of content associated with one of the issues (or tickets).

The client application 111 may transmit a request to the middleware application 105 for the details of the issue and associated content. The request may include the identification of the user, the identification of the issue, and the universal resource locator. The middleware application 105 may retrieve the issue details, field mappings, and/or one-time token from the database 155 and return the issue details, field mappings, and/or one-time token in an encrypted state to the client application 111. The client application 111 may decrypt the content (e.g., issue details and field mappings and one-time token) using the private key and may display the decrypted data on a user interface of the client application 111 on the display screen of the client computing device 102.

Figure 6:
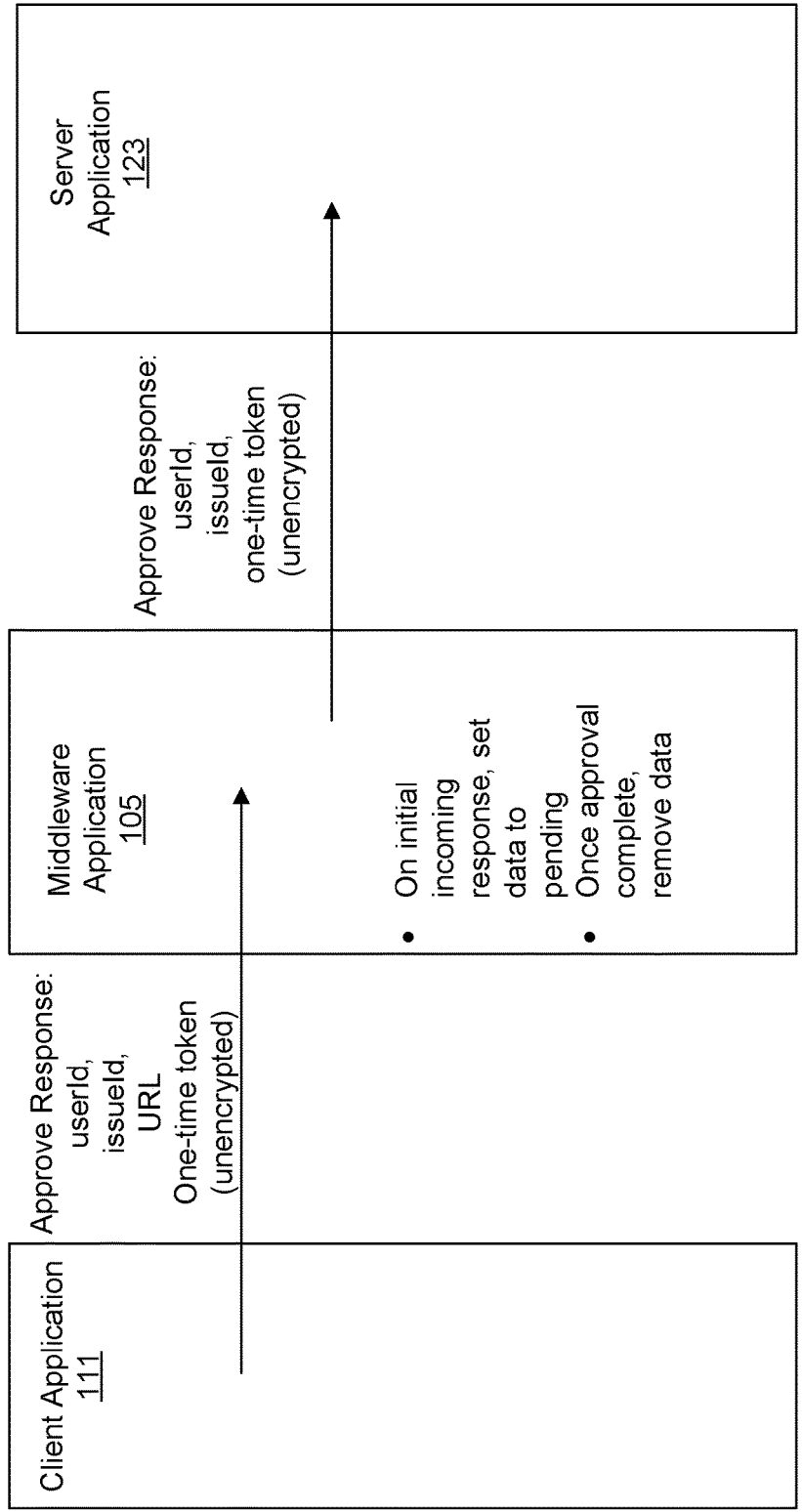
FIG. 6 illustrates an example workflow for a user approving content according to certain embodiments of this disclosure.

FIG. 6 illustrates an example workflow for a user approving content according to certain embodiments of this disclosure. The user may review the content presented on the user interface and may perform an action. For example, the user may select an option to approve the content. The client application 111 may transmit an approval response to the middleware application 105. The approval response may include the identification of the user, the identification of the issue, the universal resource locator, and the one-time token that has been decrypted. When the approval response is received, the middleware application 105 may set a flag or state for the data (content) in the database 155 to pending. The middleware application 105 may transmit the approval response to the server application 123. When the middleware application 105 receives an indication that the server has changed a state of the data based on the approval response, the middleware application 105 may perform garbage management by removing any data associated with the content from the database 155.

Figure 7:
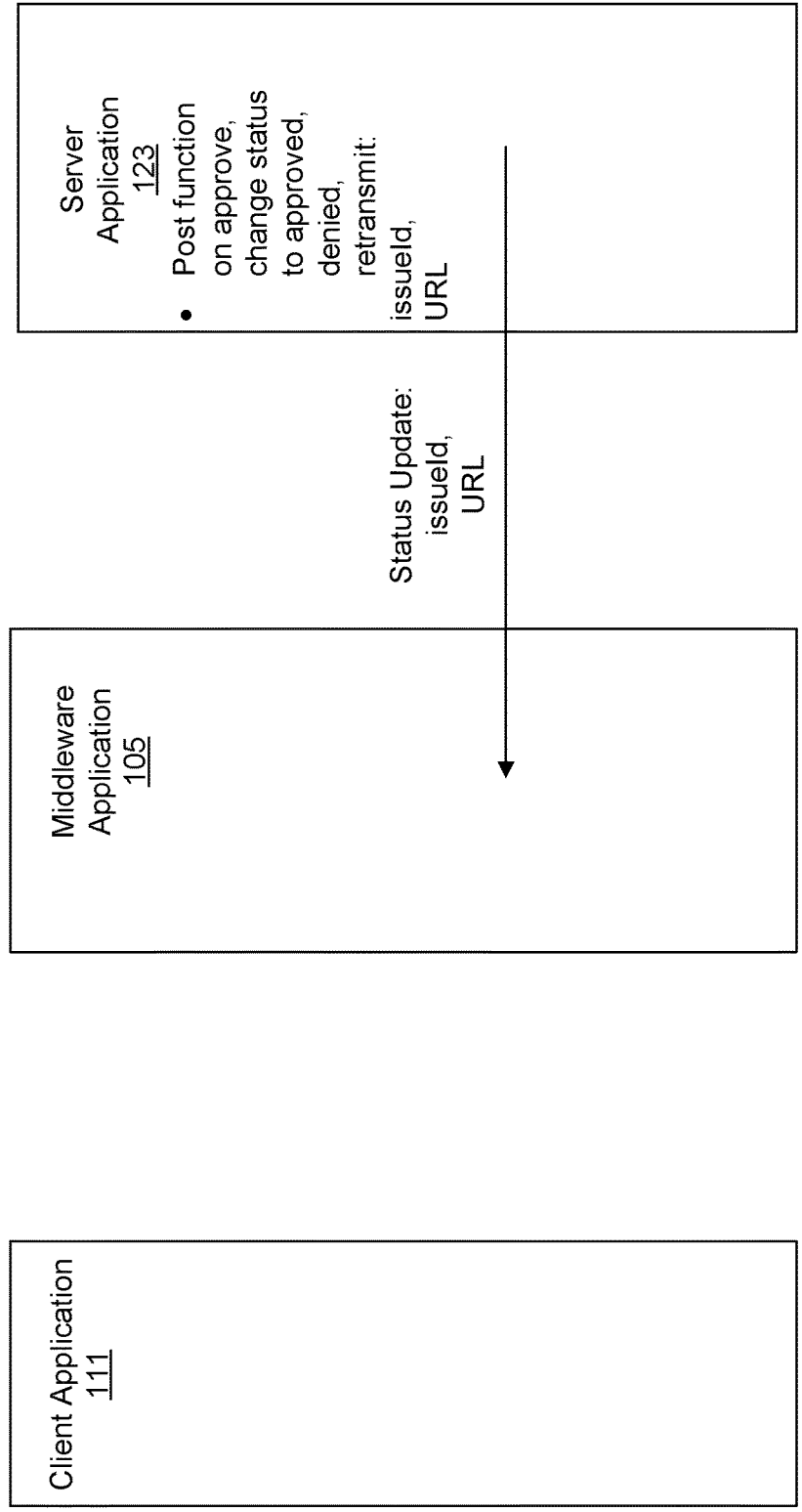
FIG. 7 illustrates an example workflow for changing a status of content according to certain embodiments of this disclosure.

FIG. 7 illustrates an example workflow for changing a status of content according to certain embodiments of this disclosure. As depicted, the server application 123 may receive the approval response from the middleware application 105 and perform a post function. The server application 123 may change a state of the content in the database 129 based on the approval response. For example, the state may be updated to approved. However, if the response include a denial, retransmit, an edit, or the like, then the state of the content is updated accordingly. The server application 123 may transmit the status update to the middleware application 105 including the identification of the issue and the universal resource locator. The status update may also include an instruction for the middleware application 105. The instruction may include deleting the content, retransmitting the content, etc. The middleware application 105 may receive the status update and perform an operation on the content in response (e.g., removing the content from the database 155).

Figure 8:
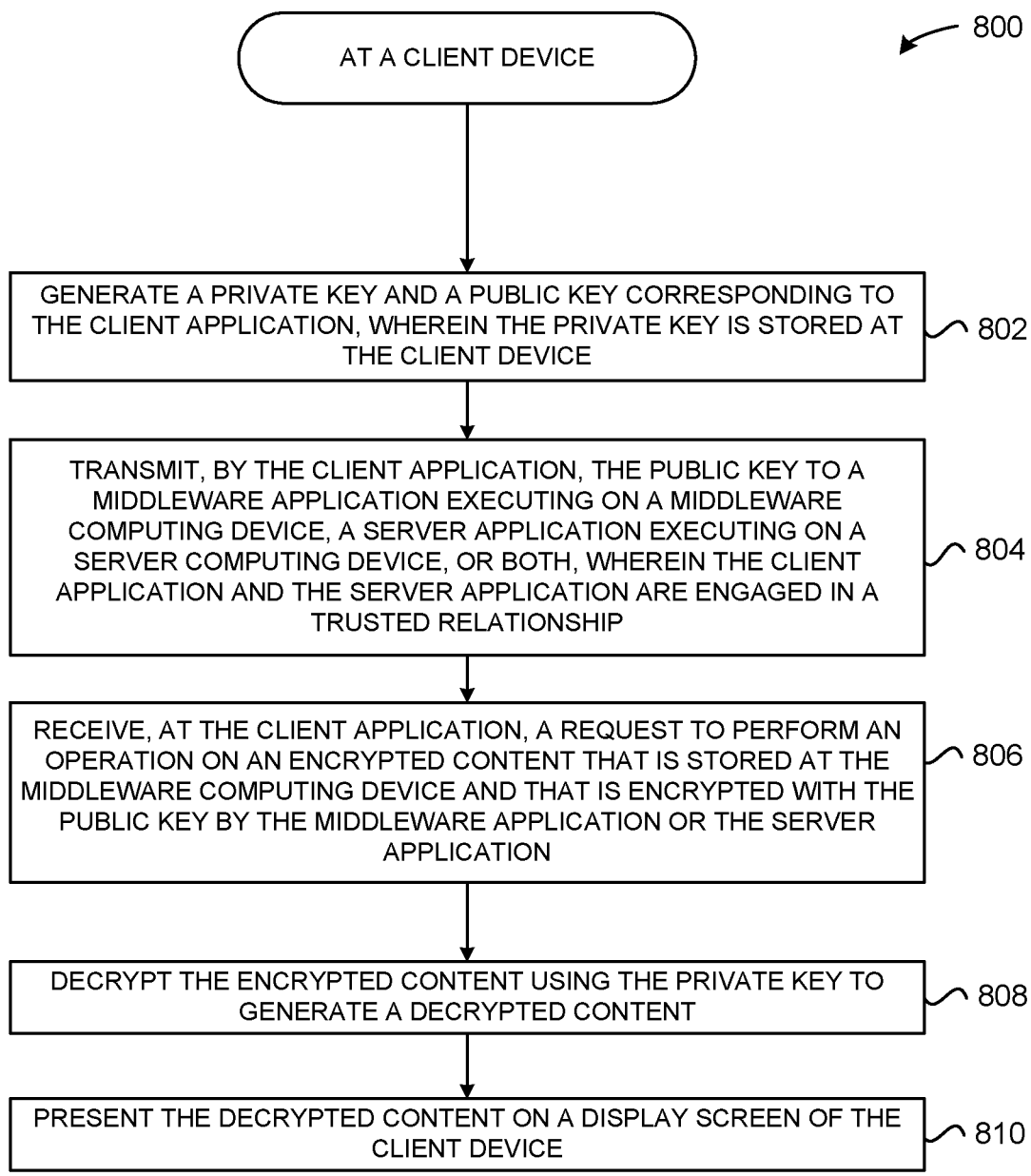
FIG. 8 illustrates an example method for a client application executing on a client computing device according to certain embodiments of this disclosure.

FIG. 8 illustrates an example method for a client application executing on a client computing device according to certain embodiments of this disclosure. The method 800 may be performed by processing logic that may include hardware (circuitry, dedicated logic, etc.), software, or a combination of both. The method 800 and/or each of their individual functions, subroutines, or operations may be performed by one or more processors of a computing device (e.g., client computing device 102 of FIG. 1) implementing the method 800. The method 800 may be implemented as computer instructions stored on a memory device and executable by the one or more processors. In certain implementations, the method 800 may be performed by a single processing thread. Alternatively, the method 800 may be performed by two or more processing threads, each thread implementing one or more individual functions, routines, subroutines, or operations of the methods.

Prior to block 802 occurring, the processing device may transmit a request to the middleware application 105 to create an account for a user of the client application 111. The request may cause the middleware application 105 to generate the account including an identification of the user (e.g., approver) associated with the client application 111 and a token. The processing device may receive the token and transmit a message (e.g., email) comprising the token to the server application 123. The server application 123 may verify the token with the middleware application 105 and may receive the identification of the user from the middleware application 105. The server application 123 may verify an email address of the user and/or the identification of the user with a list of accepted users (e.g., client entity list), and upon verification, may register the identification of the user, email address, a universal resource locator, and the like with the client application 111. The message may cause the server application 123 to present a user interface including at least the identification of the approver and an option to accept the approver for any content associated with the approver.

At block 802, a processing device may generate a private key and a public key corresponding to the client application 111. The private key may be stored at the client computing device 102. The processing device may generate the private key and the public key when the client application 111 is installed on the client computing device 102.

At block 804, the processing device may transmit the public key to the middleware application 105 executing on the middleware computing device 101, the server application 123 executing on the server computing device 128, or both. The client application 111 and the server application 123 may be engaged in a trusted relationship. The trusted relationship may be formed by the server application 123 acknowledging an identification of a user (e.g., email address, name, etc.) of the client application 111. For example, the server application 123 may maintain a list of accepted users (e.g., a client entity list). The middleware application 105 may be disengaged or not part of the trusted relationship. The client application 111 and the server application 123 may be developed and/or maintained by a same entity or organization while the middleware application 105 may be developed and/or maintained by a different entity (e.g., third-party entity) that the same entity.

At block 806, the processing device may receive, at the client application 111, a request to perform an operation on an encrypted content that is stored at the middleware computing device 101 and that is encrypted with the public key by the middleware application 105 or the server application 123. In some embodiments, the request may be a message, such as a push notification that is presented on a display screen of the client computing device 102. In some embodiments, the operation may include approving, rejecting, modifying, and/or returning the content.

In some embodiments, the processing device may receive a selection to retrieve one or more pending issues corresponding to the encrypted content. The processing device may transmit a request to the middleware application 105 for the one or more pending issues corresponding to the encrypted content. The middleware application 105 may receive the request for the one or more pending issues and may transmit the one or more pending issues corresponding to the encrypted content to the client application 111. It should be noted that the server application 123 may not be involved in providing the one or more pending issues corresponding to the encrypted content to the client application 111. As such, the computing resources of the server computing device 128 may be used for other tasks using the disclosed techniques during this stage of the method 800. The processing device may receive a selection of one of the encrypted content associated with a pending issue. For example, the pending issue may be for the user to approve a document. The client application 111 may transmit a request to the middleware application 105 for the selected content, and the middleware application 105 may transmit the encrypted content to the client application 111.

At block 808, the processing device may decrypt the encrypted content using the private key to generate a decrypted content. In some embodiments, the decrypting may include decrypting an encrypted one-time token generated by the server application 123 and that is used to approve the decrypted content with the server application 123 or perform any suitable operation on the content with the server application 123. Further, the decrypting may include decrypting details pertaining to the encrypted content, such as metadata about the content and actual information included in the content.

At block 810, the processing device may present the decrypted content on the display screen of the client computing device 102. The user may review the decrypted content and perform an operation. For example, a graphical object on a user interface of the client application 111 may be selected to approve the decrypted content. The approval response may be transmitted to the middleware application 105, which sets a flag for the encrypted content to pending. The approval response may include an identification of an issue including the decrypted content, an identification of a user using the client application, and a one-time token that is decrypted using the private key. The approval response may cause the middleware application 105 to set data pertaining to the encrypted content to a pending state. Further, the middleware application 105 may transmit the approval to the server application 123. When the server application 123 updates the status for the content, the server application 123 sends an instruction to the middleware application 105 to perform garbage management (e.g., remove the encrypted content from memory of the middleware computing device 101).

Figure 9:
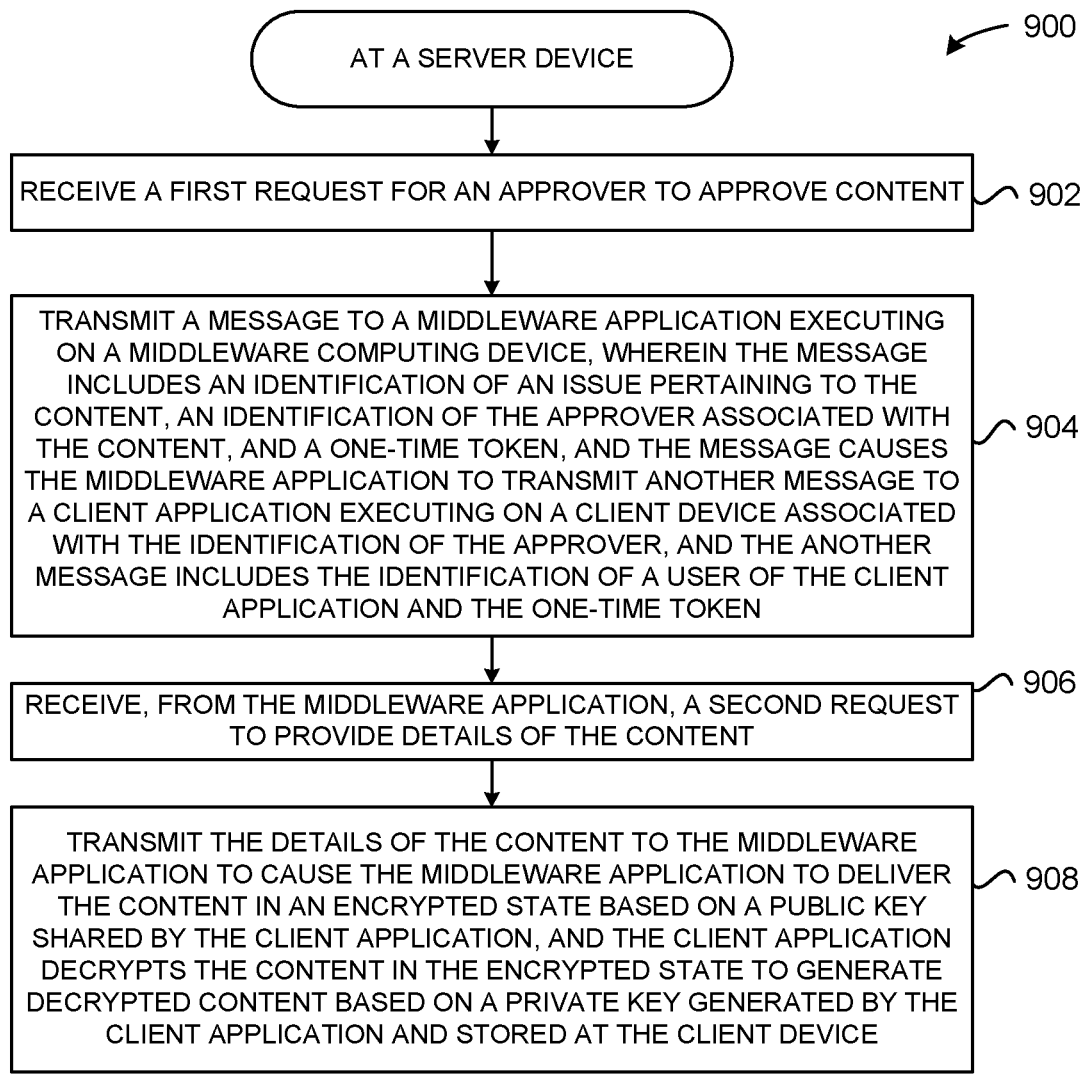
FIG. 9 illustrates an example method for a server application executing on a server computing device according to certain embodiments of this disclosure.

FIG. 9 illustrates an example method for a server application executing on a server computing device according to certain embodiments of this disclosure. Method 900 includes operations performed by processors of a computing device (e.g., server computing device 128 of FIG. 1) implementing the method 900. In some embodiments, one or more operations of the method 900 are implemented in computer instructions that stored on a memory device and executed by a processing device. The method 900 may be performed in the same or a similar manner as described above in regards to method 800.

Prior to block 902 occurring, upon the client application 111 being installed on the client computing device 102, the client application 111 may generate a private key and a public key corresponding to the client application 111. The client application 111 may transmit the public key to the middleware application 105 executing on the middleware computing device 101, the server application executing on the server computing device 128, or both. The client application 111 and the server application 123 may be engaged in a trusted relationship. The client application 111 may transmit a request to register an identification of the approver with the client application 111 to the server application 123.

A processing device executing the server application 123 may receive the request to register an identification of an approver with the client application 111 on the client computing device 102. The processing device may determine whether the identification of the user is a trusted source. Responsive to determining the identification of the user is the trusted source, the processing device may register the identification of the approver with the client application 111. In some embodiments, a user interface of the server application 123 may present, on a display screen of the server computing device 128 or any suitable computing device, the identification of the approver and an option to accept the approver as a trusted source.

At block 902, the processing device may receive a first request for an approver to approve content. The processing device may generate a one-time token corresponding to the request to be used by the client application 111 to authenticate the client application 111 and/or the approver when the approver approves that content. When the one-time token is received in an approval response and is authenticated, the one-time token may be discarded by the server application 123.

At block 904, the processing device may transmit a message to the middleware application 105 executing on the middleware computing device 101. The message may include an identification of an issue pertaining to the content, an identification of the approver associated with the content, and a one-time token. The message may cause the middleware application 105 to transmit another message to the client application 111 executing on the client computing device 111 associated with the identification of the approver. The another message may include the identification of the approver and the one-time token.

At block 906, the processing device may receive, from the middleware application 105, a second request to provide details of the content. The processing device may retried the details from the database 129. In some embodiments, the processing device may encrypt the details using the public key corresponding to the client application 111.

At block 908, the processing device may transmit the details of the content to the middleware application 105 to cause the middleware application 105 to deliver the content in an encrypted state based on a public key shared by the client application 111, and the client application 111 may decrypt the content in the encrypted state to generate decrypted content based on a private key generated by the client application 111 and stored at the client computing device 102. The public key may be generated by the client application 111 upon installation of the client application 111 on the client computing device 102, the private key may also be generated upon installation of the client application 111 on the client computing device 102.

In some embodiments, the processing device may receive, from the middleware application 105, a response including an approval of the decrypted content. The response may include an identification of the issue including the decrypted content, the identification of the approver, and a decrypted one-time token. The decrypted one-time token may have been decrypted by the client application 111 using the private key. The processing device may verify the decrypted one-time token matches the one-time token initially sent. Responsive to verifying the decrypted one-time token matches the one-time token initially sent, the processing device may change a state of the decrypted content to approved. Other states for the decrypted content may include rejected, returned, modified, etc. The processing device may transmit a second message to the middleware application 105. The second message may indicate the decrypted content is approved and the second message may cause the middleware application 105 to delete the encrypted content from the middleware computing device 101.

Figure 10:
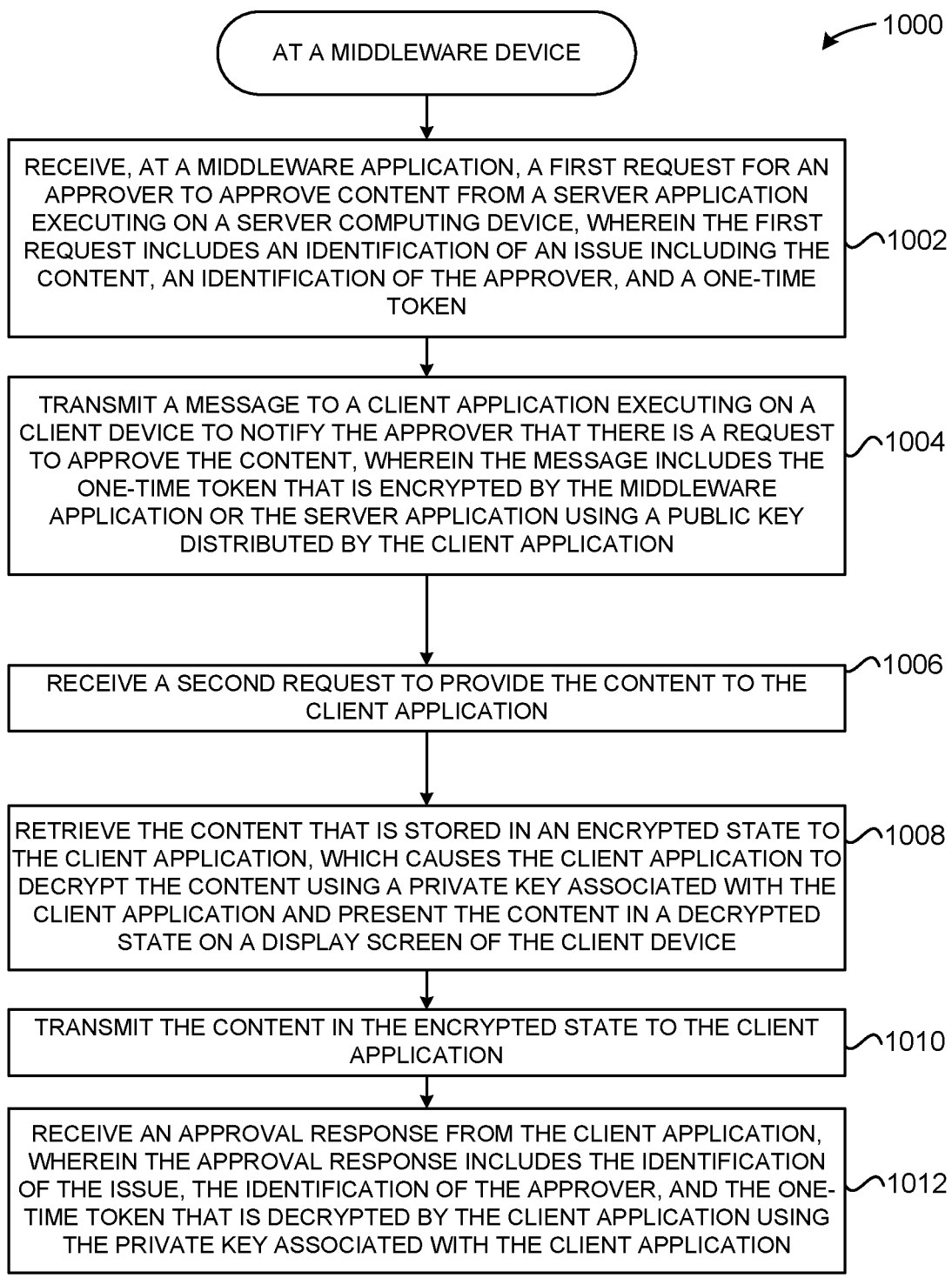
FIG. 10 illustrates an example method for a middleware application executing on a middleware computing device according to certain embodiments of this disclosure.

FIG. 10 illustrates an example method 1000 for a middleware application executing on a middleware computing device according to certain embodiments of this disclosure. Method 1000 includes operations performed by processors of a computing device (e.g., middleware computing device 101 of FIG. 1) implementing the method 1000. In some embodiments, one or more operations of the method 1000 are implemented in computer instructions that stored on a memory device and executed by a processing device. The method 1000 may be performed in the same or a similar manner as described above in regards to method 800.

Prior to block 1002 occurring, the processing device executing the middleware application 105 may receive a request from the client application 111 to create an account for an approver using the client application 111. The processing device may generate the identification of the approver and a token to be used by the client application 111 when registering the client application 1111 with the identification of the approver at the server application 123. The processing device may transmit the identification of the approver and the token to the client application 111.

At block 1002, the processing device executing the middleware application 105 may receive a first request for an approver to approve content from a server application 123 executing on the server computing device 128. The first request may include an identification of an issue including the content. The issue may pertain to an action item that the approver has not yet performed. For example, the issue may indicate there is a document that is pending the approver's approval. The first request also includes an identification of the approver and a one-time token generated by the server application 123. The one-time token may be encrypted with the public key corresponding to the client application 111. The processing device may store an entry in the database 155 based on the first request. The entry may include a timestamp, the identification of the issue including the content, the identification of the approver, the one-time token in an encrypted state, a universal resource locator, or some combination thereof.

At block 1004, the processing device may transmit a message to the client application 111 executing on the client computing device 102 to notify the approver that there is a request to approve the content. The message may include the one-time token that is encrypted by the middleware application 105 or the server application 123 using the public key distributed by the client application 111.

At block 1006, the processing device may receive a second request to provide the content to the client application 111.

At block 1008, the processing device may retrieve the content that is stored in an encrypted state after being encrypted by the middleware application 105 or the server application 123 using the public key.

At block 1010, the processing device may transmit the content in the encrypted state to the client application 111, which causes the client application 111 to decrypt the content using a private key associated with the client application and present the content in a decrypted state on a display screen of the client computing device 102.

At block 1012, the processing device may receive an approval response from the client application. The approval response may include the identification of the issue, the identification of the approver, and the one-time token that is decrypted by the client application 111 using the private key associated with the client application 111. In some embodiments, the client application 111 and the server application 123 may be engaged in a mutually trusted relationship that excludes the middleware application 105.

Figure 11:
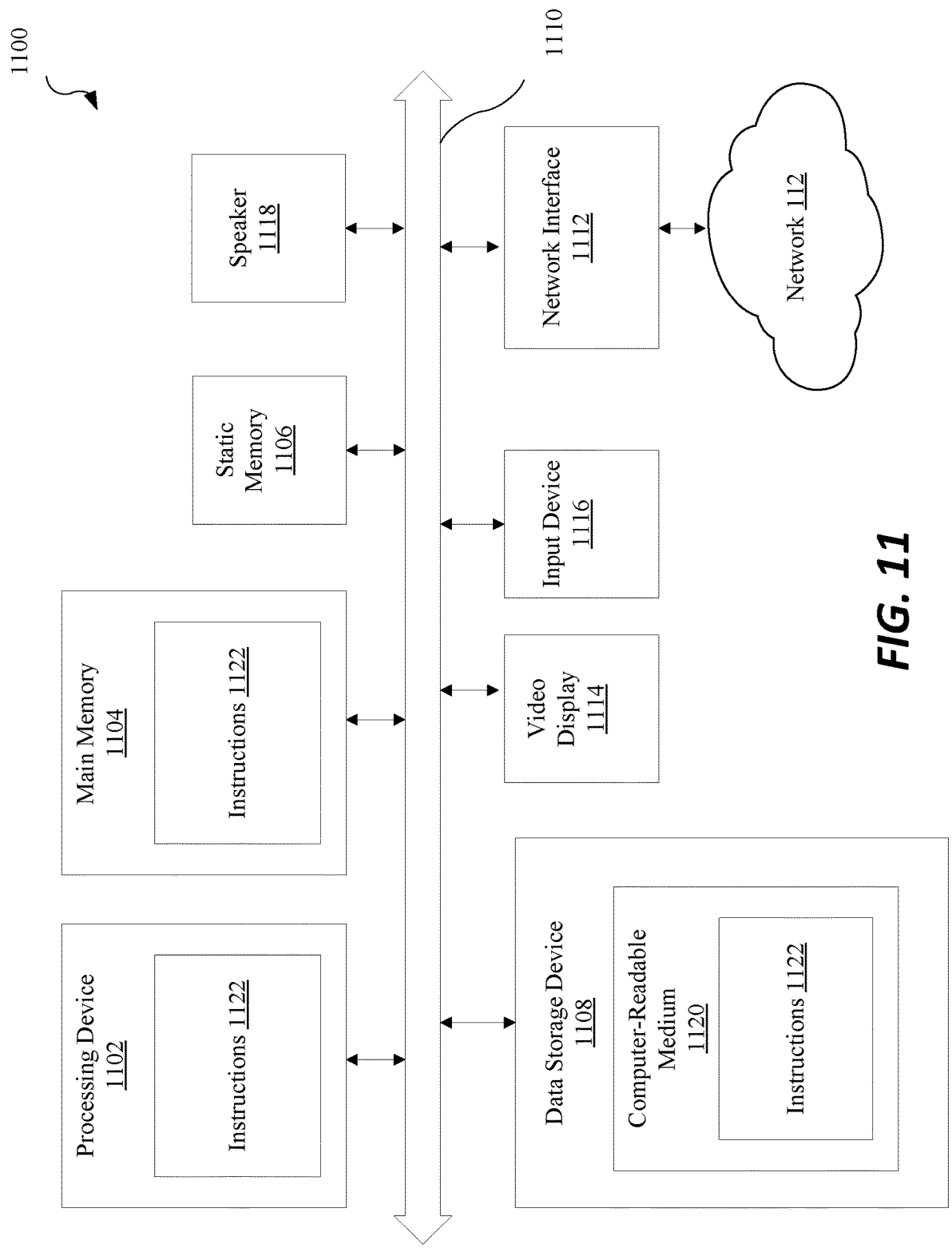
FIG. 11 illustrates an example computer system.

FIG. 11 illustrates an example computer system 1100, which can perform any one or more of the methods described herein. In one example, computer system 1100 may correspond to the computing device 101, the computing device 102, one or more servers 128 of the cloud-based computing system 116, or one or more training engines 152 of the cloud-based computing system 16 of FIG. 1. The computer system 1100 may be capable of executing the user portal 105, the tracking application 111, or the third party application 107 of FIG. 1. The computer system 1100 may be connected (e.g., networked) to other computer systems in a LAN, an intranet, an extranet, or the Internet. The computer system 1100 may operate in the capacity of a server in a client-server network environment. The computer system 1100 may be a personal computer (PC), a tablet computer, a wearable (e.g., wristband), a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 1100 includes a processing device 1102, a main memory 1104 (e.g., read-only memory (ROM), solid state drive (SSD), flash memory, dynamic random access memory (DRAM) such as synchronous DRAM (SDRAM)), a static memory 1106 (e.g., solid state drive (SSD), flash memory, static random access memory (SRAM)), and a data storage device 1108, which communicate with each other via a bus 1110.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions for performing any of the operations and steps discussed herein.

The computer system 1100 may further include a network interface device 1112. The computer system 1100 also may include a video display 1114 (e.g., a liquid crystal display (LCD) or a cathode ray tube (CRT)), one or more input devices 1116 (e.g., a keyboard and/or a mouse), and one or more speakers 1118 (e.g., a speaker). In one illustrative example, the video display 1114 and the input device(s) 1116 may be combined into a single component or device (e.g., an LCD touch screen).

The data storage device 1116 may include a computer-readable medium 1120 on which the instructions 1122 (e.g., implementing the application programming interface 135, the user portal 105, the tracking application 111, the third party application 107, and/or any component depicted in the FIGURES and described herein) embodying any one or more of the methodologies or functions described herein are stored. The instructions 1122 may also reside, completely or at least partially, within the main memory 1104 and/or within the processing device 1102 during execution thereof by the computer system 1100. As such, the main memory 1104 and the processing device 1102 also constitute computer-readable media. The instructions 1122 may further be transmitted or received over a network via the network interface device 1112.

While the computer-readable storage medium 1120 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The invention claimed is:

1. A method performed by a client application executing on a client computing device, the method comprising:
   generating a private key and a public key corresponding to the client application, wherein the private key is stored at the client computing device;
   transmitting the public key to a middleware application executing on a middleware computing device, a server application executing on a server computing device, or both, wherein:
   the client application and the server application are engaged in a trusted relationship;
   receiving, at the client application, a request to perform an operation on an encrypted content that is stored at the middleware computing device and that is encrypted with the public key by the middleware application or the server application;
   decrypting the encrypted content using the private key to generate a decrypted content; and
   presenting the decrypted content on a display screen of the client computing device.

2. The method of claim 1, wherein:
   the trusted relationship is formed by the server application acknowledging an identification of a user of the client application, and
   middleware application is disengaged in the trusted relationship.

3. The method of claim 1, wherein the client application and the server application are developed by a same entity and the middleware application is developed by a third-party entity.

4. The method of claim 1, wherein the request is a push notification, and the method further comprises:
receiving a selection to retrieve one or more pending issues corresponding to the encrypted content.

5. The method of claim 1, further comprising:
transmitting a request to the middleware application to create an account for a user of the client application, wherein the request causes the middleware application to generate the account comprising an identification of an approver associated with the client application and a token;
receiving, from the middleware application, the token; and
transmitting a message comprising the token to the server application to cause the server application to verify the token with the middleware application, obtain the identification of the user, and register the identification of the user with the client application.

6. The method of claim 5, wherein the message further causes the server application to present a user interface including at least the identification of the approver and an option to accept the approver for any content associated with the approver.

7. The method of claim 1, wherein the operation comprises approving, rejecting, or modifying.

8. The method of claim 1, wherein decrypting the encrypted content using the private key to generate the decrypted content comprises decrypting an encrypted one-time token used to approve the decrypted content with the server application, decrypting details pertaining to the encrypted content, or both.

9. The method of claim 1, further comprising:
performing the operation on the decrypted content by transmitting a response to the middleware application, wherein the response comprises an identification of an issue including the decrypted content, an identification of a user using the client application, and a one-time token that is decrypted using the private key, wherein:
the response causes the middleware application to set data pertaining to the encrypted content to a pending state, and upon receiving another response from the server application, deleting the encrypted content from the middleware computing device.

10. A method performed by a server application executing on a server computing device, the method comprising:
receiving a first request for an approver to approve content;
transmitting a message to a middleware application executing on a middleware computing device, wherein:
the message comprises an identification of an issue pertaining to the content, an identification of the approver associated with the content, and a one-time token, and
the message causes the middleware application to transmit another message to a client application executing on a client computing device associated with the identification of the approver, and the another message comprises the identification of the approver of the client application and the one-time token;
receiving, from the middleware application, a second request to provide details of the content; and transmitting the details of the content to the middleware application to cause the middleware application to deliver the content in an encrypted state based on a public key shared by the client application, and the client application decrypts the content in the encrypted state to generate decrypted content based on a private key generated by the client application and stored at the client computing device.

11. The method of claim 10, wherein the public key is generated by the client application upon installation of the client application on the client computing device, the private key is also generated upon installation of the client application on the client computing device.

12. The method of claim 10, further comprising:
receiving, from the middleware application, a response comprising an approval of the decrypted content, wherein:
the response further comprises an identification of the issue including the decrypted content, the identification of the approver, and a decrypted one-time token, and
the decrypted one-time token has been decrypted by the client application using the private key;
verifying the decrypted one-time token matches the one-time token sent in the message;
responsive to verifying the decrypted one-time token matches the one-time token, changing a state of the decrypted content to approved; and
transmitting a second message to the middleware application, wherein:
the second message indicates the decrypted content is approved, and
the second message causes the middleware application to delete the encrypted content from the middleware computing device.

13. The method of claim 10, further comprising:
receiving a third request to register an identification of the approver with the client application executing on the client computing device;
determining whether the identification of the approver is a trusted source; and
responsive to determining the identification of the approver is the trusted source, registering the identification of the approver with the client application.

14. The method of claim 13, further comprising:
presenting, on a display screen of a server computing device, the identification of the approver and an option to accept the approver as the trusted source.

15. The method of claim 10, wherein the client computing device is a mobile device.

16. The method of claim 10, wherein:
in response to installing the client application on the client computing device, the client application generates the private key and the public key corresponding to the client application,
the client application transmits the public key to the middleware application executing on the middleware computing device, the server application executing on a server computing device, or both, and
the client application and the server application are engaged in a trusted relationship.

17. A method performed by a middleware application executing on a middleware computing device, the method comprising:
receiving a first request for an approver to approve content from a server application executing on a server computing device, wherein:

the first request comprises an identification of an issue including the content, an identification of the approver, and a one-time token;

transmitting a message to a client application executing on a client computing device to notify the approver that there is a request to approve the content, wherein:

the message includes the one-time token that is encrypted by the middleware application or the server application using a public key distributed by the client application;

receiving a second request to provide the content to the client application;

retrieving the content that is stored in an encrypted state after being encrypted by the middleware application or the server application using the public key;

transmitting the content in the encrypted state to the client application, which causes the client application to decrypt the content using a private key associated with the client application and present the content in a decrypted state on a display screen of the client computing device; and receiving an approval response from the client application, wherein:

the approval response comprises the identification of the issue, the identification of the approver, and the one-time token that is decrypted by the client application using the private key associated with the client application.

18. The method of claim 17, further comprising storing an entry based on the first request, wherein the entry comprises a timestamp, the identification of the issue including the content, the identification of the approver, the one-time token in an encrypted state, a universal resource locator, or some combination thereof.

19. The method of claim 17, further comprising:

receiving, from the client application, a third request to create an account for the approver of the client application;

generating the identification of the approver and a token to be used by the client application when registering the client application with the identification of the approver at the server application; and transmitting the identification of the approver and the token to the client application.

20. The method of claim 17, wherein the client application and the server application are engaged in a mutually trusted relationship that excludes the middleware application.

* * * * *